Figure 8:
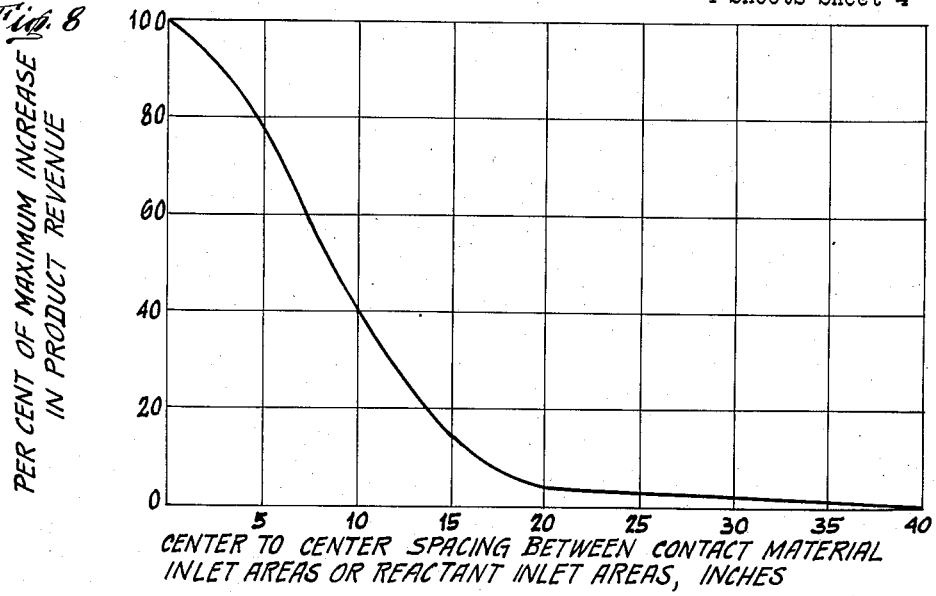

Aug. 5, 1958  R. R. HALIK  2,846,371
HYDROCARBON CONVERSION METHOD AND APPARATUS
Filed March 4, 1957  4 Sheets-Sheet 1
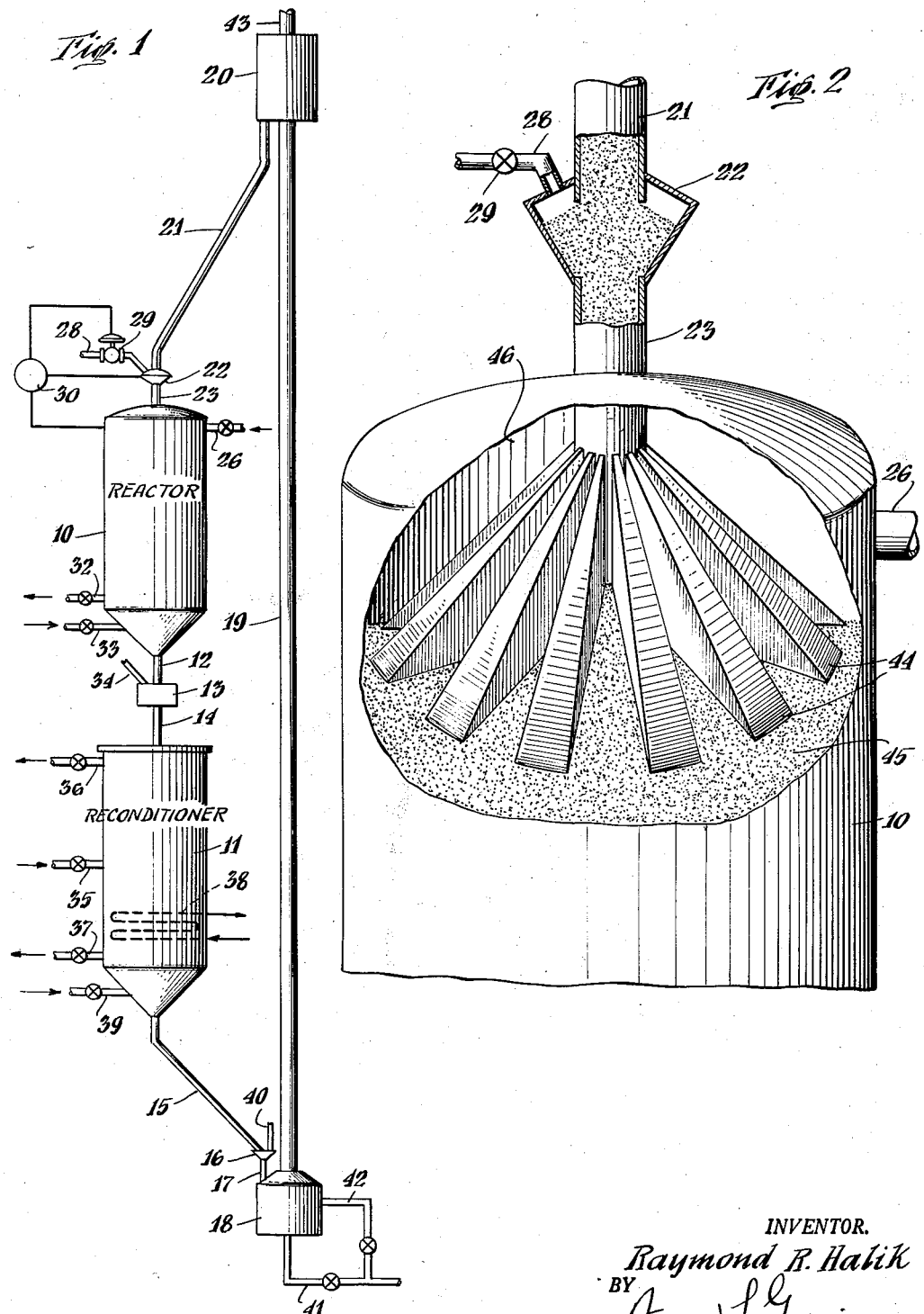
INVENTOR.
Raymond R. Halik
BY Andrew L. Jaboriault
AGENT

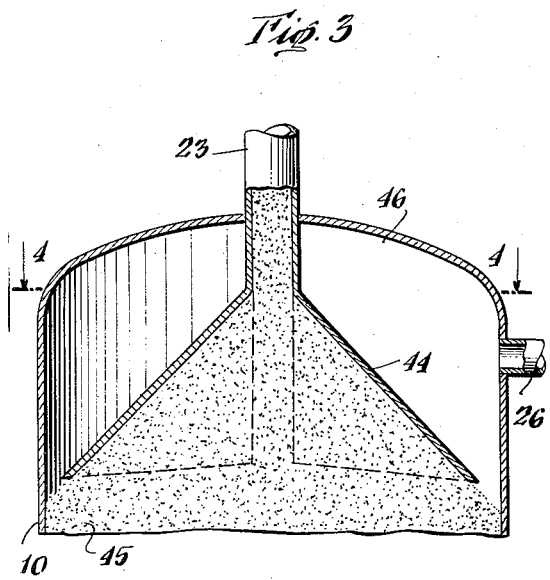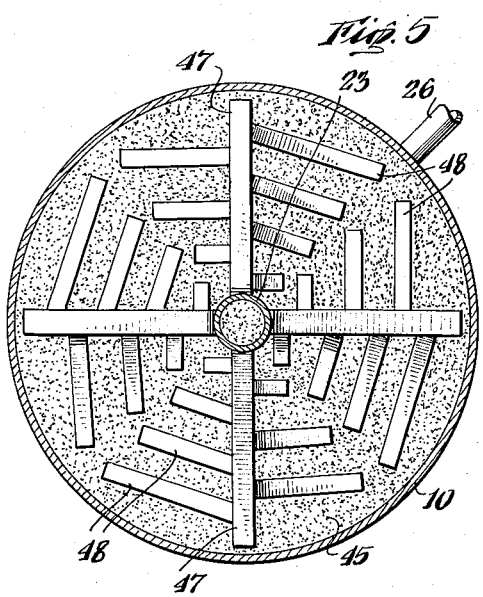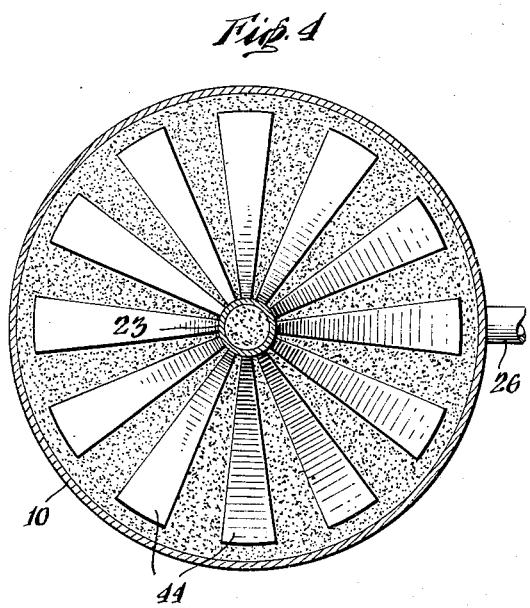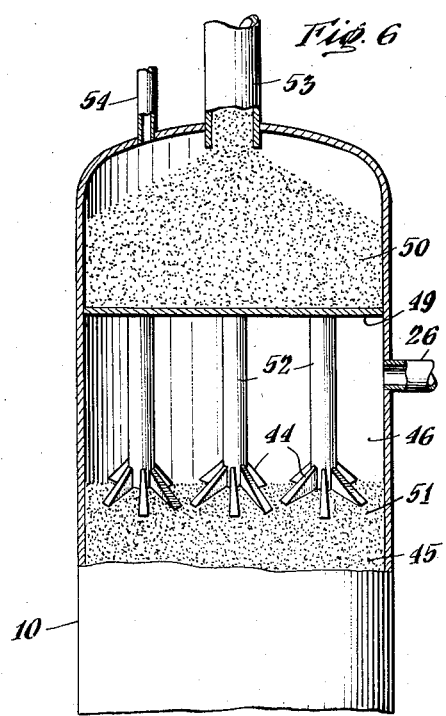

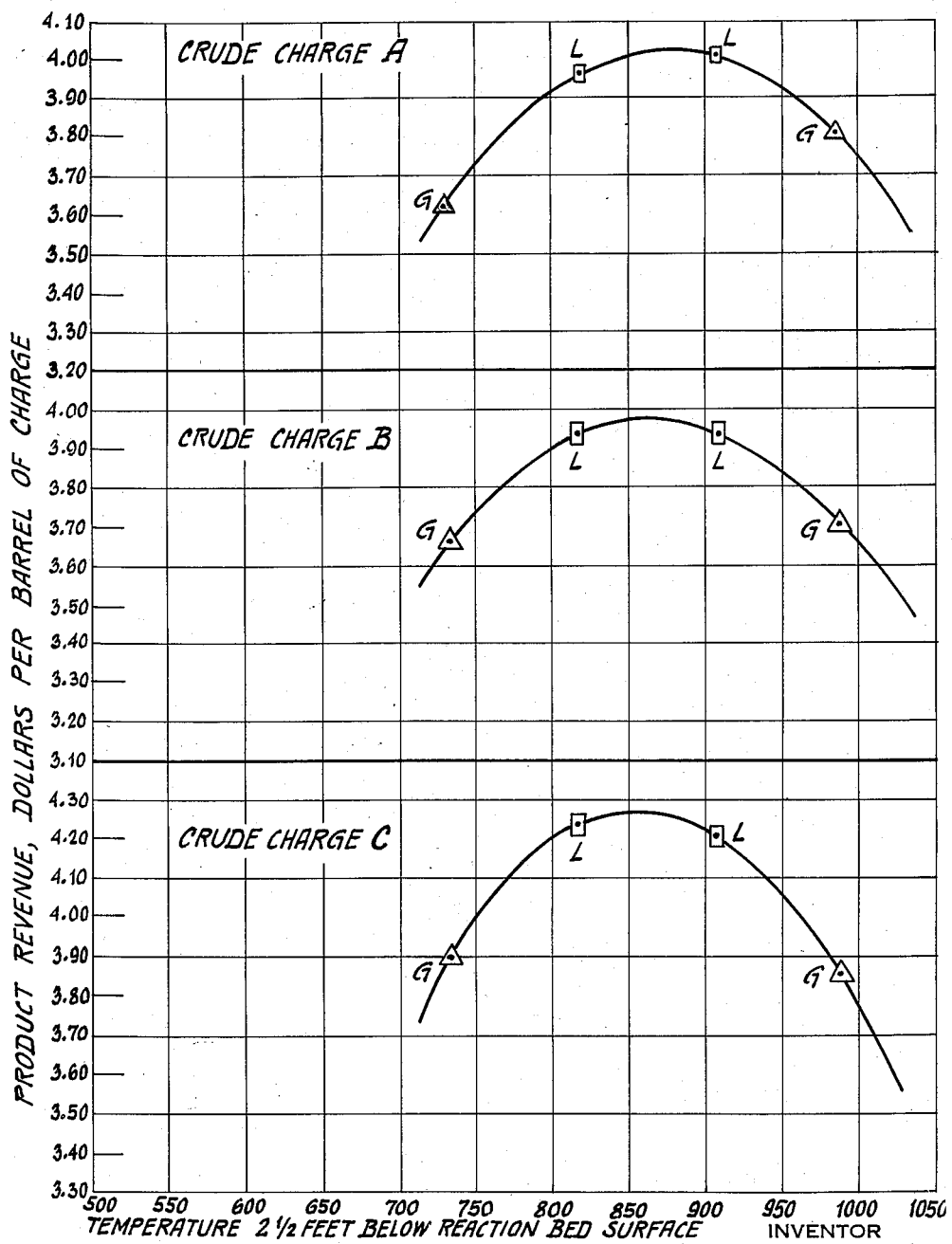

Aug. 5, 1958 R. R. HALIK 2,846,371
HYDROCARBON CONVERSION METHOD AND APPARATUS
Filed March 4, 1957 4 Sheets-Sheet 4

INVENTOR
Raymond R. Halik
BY
Andrew L. Jabonicult
ATTORNEY

United States Patent Office 2,846,371
Patented Aug. 5, 1958

2,846,371

HYDROCARBON CONVERSION METHOD AND APPARATUS

Raymond R. Halik, Pitman, N. J., assignor to Socony Mobil Oil Company, Inc., a corporation of New York Application March 4, 1957, Serial No. 643,729

11 Claims. (Cl. 196—52)

This application is a continuation-in-part of copending application, Serial Number 550,271, filed December 1, 1955, now abandoned.

This invention is concerned with a method and apparatus for the conversion of fluid reactants in the presence of a moving mass of granular contact material which may or may not exhibit catalytic properties with respect to the conversion reaction. It is particularly concerned with a method and apparatus for conducting such conversions which avoids any substantial temperature gradient across the contact material mass at any given level and promotes uniform conversion of the charge.

Typical of processes to which this invention may be applied is the catalytic conversion of high boiling vaporized hydrocarbons to lower boiling hydrocarbons by passing the vaporized charge downwardly through a downwardly gravitating, substantially compact column of granular adsorbent catalytic material at temperatures of the order of 850° F. and upwards. Other exemplary processes are the thermal cracking, coking or visbreaking of a vaporized hydrocarbon charge by contact with a heated inert contact material, and the catalytic reforming, desulfurization, isomerization, and the like, of a vaporized hydrocarbon in the presence of a granular catalyst.

Suitable contact material which is catalytic in nature may partake of the nature of natural or treated clays, bauxite, activated alumina or synthetic associations of silica, alumina, or silica and alumina, to which other substances, such as certain metallic oxides, may be added in small amounts for specific purposes. Contact material which is inert in character may partake of the form of refractory materials, such as zirkite, corhart or mullite, or it may partake of the form of stones or metallic particles or balls. In any case, it is desirable to maintain the contact material particles within the size range about 1 inch to 100 mesh, and preferably about 4 to 20 mesh, by Tyler Standard Screen Analysis. The term "granular" is used in describing and claiming this invention to include particles of this size range, whether of regular shape, such as pellets, tablets or spheres, or irregular shape, such as are obtained from grinding and screening operations.

In processes of the aforementioned types, it is usual to maintain a substantially compact bed of contact material within a confined conversion zone with a gas plenum space above the bed in open communication therewith to which the gaseous reactants are supplied. Used contact material is removed from the lower section of the bed to promote downward movement of the bed while fresh contact material is supplied to the upper surface of the bed at one or more points of restricted area. The gaseous reactant, at a temperature substantially different than the contact material supplied to the bed, passes into the upper end of the bed and downwardly therethrough to effect the desired conversion reaction. Such a system results in cross-flow of contact material and reactant at the upper end of the bed which in turn leads to a temperature gradient across the bed, resulting in uneven conversion of the gaseous reactant. This will be best understood by considering, as an example, a hydrocarbon conversion system operated in the above manner.

In such a system it is usually necessary to introduce the vaporized hydrocarbon charge, which may be the total charge or only a portion thereof, to the conversion zone at temperatures substantially below the optimum conversion temperature. This is necessary because the optimum conversion temperature is ordinarily above the temperature at which the vaporized charge undergoes thermal decomposition, and in order to obtain the best quality product, such thermal decomposition must be avoided in the vapor charge preheater. Therefore, the heat required to raise the temperature of the vaporized charge from the level to which it can be heated in the preheater without thermal decomposition to the optimum conversion temperature will normally be supplied by the contact material charged to the conversion zone. In addition, the heat required by the conversion reaction, which is normally endothermic, is usually supplied by this contact material. Therefore, contact material supplied to the conversion zone will necessarily be at a temperature substantially above the temperature of the vaporized charge supplied to the conversion zone. This temperature differential may be as much as several hundred degrees.

Where the contact material is supplied to the upper surface of the bed as a single central stream of restricted area, as is frequently the case, the upper surface of the bed will assume the shape of a cone with apex at the bottom of the supply stream and sides sloping downwardly and outwardly at angles with the horizontal equal to the angle of repose of the contact material. The angle of repose is normally within the range about 25 to 45 degrees with the horizontal. For most commercially used contact materials it is about 30 degrees. The vaporized charge is supplied to the plenum space which is above the bed and in open communication therewith and enters the upper end of the bed. Some of the contact material from the supply stream passes directly into the bed in the area directly beneath the supply stream but a major portion of the contact material passes outwardly across the upper end of the bed as a transversely flowing layer to supply the portions of the bed not lying directly beneath the supply stream. The upper side of this layer forms the upper surface of the bed and particles from the layer enter the main body of the bed wherein the flow of particles is substantially unidirectionally downward. The cooler vaporized charge entering the bed passes first through this transversely flowing layer and acts to cool the particles therein. No temperature equilibrium is reached since the transverse layer flows across the vapor stream. Any given particle in the layer will therefore be cooled an amount, depending on its distance of travel in the layer before entering the main body of the bed.

In addition, some of the cool vapor must flow laterally to fill the portion of the bed directly beneath the supply streams. This vapor will be heated as it flows, the portion thereof which must travel the greatest lateral distance being heated the most.

The sum total of all of this heat exchange is that there is produced across the reaction bed a temperature differential with a maximum immediately below the center of the supply stream and a minimum at the most remote point therefrom. This variation in temperature may be as much as several hundred degrees.

Substantially the same effect occurs where contact material is supplied to several widely spaced-apart restricted areas, except that there will be several points of maximum and minimum temperature. The temperature gradient results in varying degrees of conversion in various laterally spaced-apart regions of the column with probable overconversion beneath the supply stream and underconversion in regions beneath the outer edges of the conical pile.

It might be thought that the temperature across the column would tend to become uniform shortly below its upper surface due to interchange of contact material across the column between high and low temperature regions. It has been found that the degree of such interchange is slight, so that there is still a marked temperature gradient across the column at its lower end. It would also seem that there should be interchange of vapors across the column between high and low temperature regions which would tend to minimize the uneven conversion in the two sections by subjecting any given unit of charge for a part of its passage through the column to high temperature contact material and for the remainder to lower temperature contact material. It has been found, however, that the expected interchange of vapors through the column does not occur to any great extent. It might further be expected that heat transfer between contact material particles across the bed would tend to equalize the temperature in the lower sections of the bed. The rate of heat transfer between contact material particles is so low, however, that this does not occur.

Where the process is one in which the gaseous reactants are at a higher temperature than the contact material, the situation is reversed. The low temperature point is beneath the contact material supply stream, while the high temperature point is near the outer edge of the contact material bed. The undesirable results are obviously the same, however.

An additional reason for the uneven conversion and temperature gradient across the contact material column in such processes is found in the varying sizes of the contact material particles. While the contact material is normally kept within certain size limits, there is a variation in size within these limits. Also, some finer material is normally formed by attrition during the cyclic process. When the contact material is supplied to the column as a central stream, the large particles tend to roll over the column surface to the outer portions of the column and concentrate there, while the smaller particles concentrate near the center of the column. This results in channeling of the gaseous reactant through the column, and again, uneven reaction.

A major object of this invention is to provide a method and apparatus for the conversion of fluid reactants which overcomes the above-described difficulties.

Another object of this invention is to provide a method and apparatus for the conversion of a substantially entirely vaporized hydrocarbon charge uniformly to gaseous products.

Another object of this invention is to provide a method and apparatus for the conversion of a substantially entirely vaporized hydrocarbon charge to lower boiling products in the presence of a downwardly gravitating volumn of granular contact material which avoids overreaction of a portion of the charge, underreaction of the remainder, and a resultant non-uniform product.

These and other objects of the invention will be apparent from the following discussion of the invention.

This invention discloses a process and apparatus for the conversion of a fluid reactant in the presence of a downwardly gravitating, substantially compact bed of granular contact material, wherein the contact material bed is maintained within the lower section of a confined conversion zone. A substantially compact feed stream of contact material is passed into the upper section of the zone and the lower section of the feed stream expanded as a plurality of separate, horizontally spaced-apart, substantially compact streams of contact material which pass onto the upper surface of the bed. Each of these latter streams is confined on top and sides at angles with the horizontal greater than the angle of repose of the contact material by means of solid confining surfaces, while the bottom of each of these latter streams is in open communication with the upper surface of the bed from the point of division of the streams from the feed stream. The size and spacing of the plurality of streams is such that the maximum distance center-to-center between any two adjacent streams is no more than about 16 inches, and preferably no more than about 8 inches. The fluid reactant, at a temperature substantially different from the temperature of the contact material in the feed stream, is supplied to the upper section of the conversion zone at a level above the upper surface of the bed and passes into that upper surface between the plurality of spaced-apart streams and then passes downwardly through the bed to effect the desired conversion reaction. Products of conversion are removed from the lower section of the conversion zone and spent granular contact material is removed from the lower section of the bed.

Figure 9:
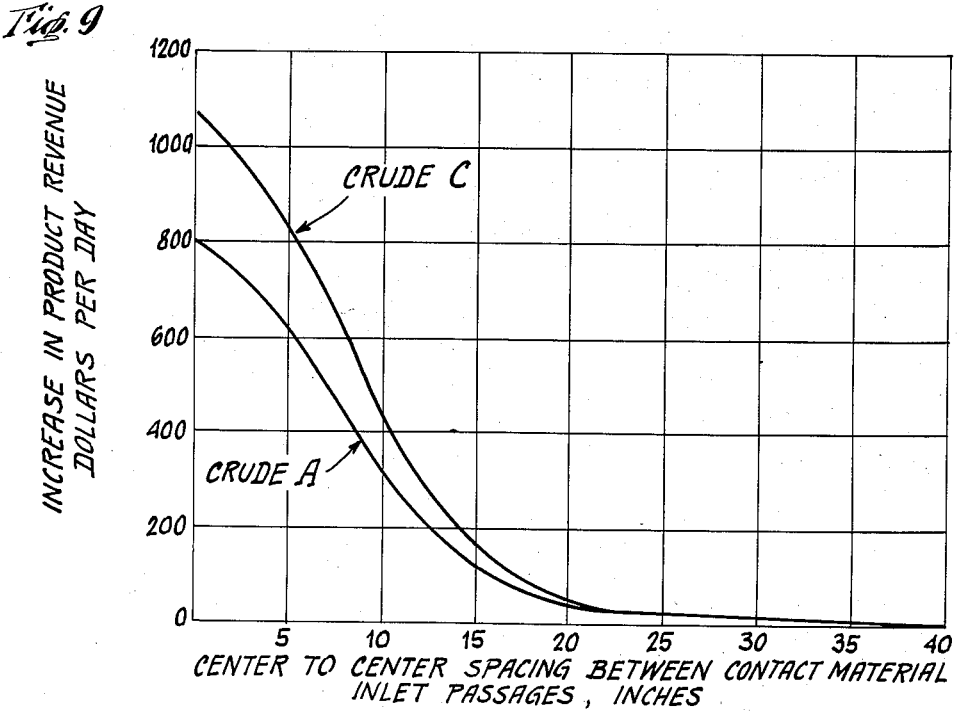

This invention will be best understood by referring to the attached drawings, of which Figure 1 is an elevational view illustrating a typical hydrocarbon conversion system to which this invention may be applied, Figure 2 is an elevational view of the upper section of a conversion vessel employing this invention, with a portion of the side wall of the vessel cut away to illustrate the contact material distributing means, Figure 3 is an elevational sectional view of the upper section of the conversion vessel of Figure 2, Figure 4 is a sectional view along line 4—4 of Figure 3, Figure 5 is a sectional view, similar to Figure 4, of a conversion vessel employing a modified form of the invention, Figure 6 is an elevational view, partially in section, of the upper portion of a conversion vessel employing a second modification of this invention, Figure 7 presents a graph illustrating the variation in product revenue with conversion temperature, Figure 8 is a graph illustrating the increase in product revenue that may be obtained using this invention rather than the prior art for all charge stocks, and Figure 9 is a graph illustrating the increase in product revenue using this invention over the prior art for two specific charge stocks.

All of these figures are diagrammatic in form and like parts in all bear like numerals.

Turning to Figure 1, there is shown therein a reaction or conversion vessel 10 superimposed on a reconditioning vessel 11. Contact material withdrawal conduit 12 extends from the lower section of vessel 10 into a depressuring vessel 13 and conduit 14 connects the depressurizer with the upper section of vessel 11. Conduit 15 extends from the lower end of vessel 11 into a vent chamber 16 and conduit 17 connects the vent chamber with a lift feed tank 18. Lift pipe 19 extends vertically upwardly from within lift tank 18 to an intermediate level in separator 20 positioned at a level above vessel 10. Conduit 21 extends from the lower section of the separator into seal chamber 22. Conduit 23 extends from the lower section of chamber 22 centrally and vertically into the upper section of vessel 10.

In operation, granular contact material, at a temperature suitable to supply a substantial portion of the heat required by the conversion reaction, gravitates from the lower section of separator 20 through passage 21 into seal zone 22. In zone 22 a pressure of inert gas is maintained slightly above the pressure in the upper section of conversion zone 10. This is accomplished by supplying an inert gas, such as steam or flue gas, to zone 22 through passage 28 at a rate controlled by diaphragm valve 29 in response to differential pressure controller 30. A downwardly gravitating, substantially compact bed or column of contact material is maintained within conversion zone in housing 10. A substantially compact feed stream of contact material passes from seal zone 22 centrally and vertically into the upper end of vessel 10 through passage 23 to supply the bed therein. A vaporized hydrocarbon charge is supplied to the upper section of vessel 10 through passage 26. This vaporized charge passes downwardly through the contact material column in zone 10 and is converted to gaseous products. These products are removed through passage 32. The spent contact material is purged free of adhering hydrocarbons by inert purge gas, such as steam or flue gas, admitted through passage 33. Contact material is then passed downwardly through passage 12 into depressurizer 13, where the gas pressure is substantially relieved through vent 34. Spent contact material passes from 13 through passage 14 into the upper end of reconditioner 11. The particular reconditioner shown is a catalyst regenerator. The catalytic contact material, bearing a carbonaceous contaminant deposited thereon in the conversion zone, passes through zone 11 as a substantially compact column. A combustion supporting gas, such as air, is admitted centrally to said column through passage 35 and flows upwardly through the upper section of the column and downwardly through its lower section to burn off the contaminant deposit. Flue gas is removed through passages 36 and 37. The temperature of the contact material is maintained below the heat damaging level by means of cooling coils 38 through which a suitable cooling fluid is circulated. Other regenerator constructions than that shown may be used. For example, if the contact material is substantially inert in character, reconditioner 11 may take the form of a contact material heater. The reconditioned contact material is purged by inert purge gas admitted through passage 39 and gravitated through passage 15 to vent chamber 16 where inert gas is removed through vent 40. Contact material is then passed into lift tank 18 through passage 17. A suitable lift gas, such as air or flue gas, is admitted through conduits 41 and 42 and the contact material mixed therewith in tank 18 and transported thereby up lift pipe 19 to separator 20, where the lift gas is removed through passage 43 and contact material collects in the lower section of the separator to be returned to vessel 10.

The apparatus in the upper section of the conversion vessel 10, whereby contact material and vaporized charge are admitted to the vessel in such a manner as to avoid cooling of substantial portions of the contact material and segregation of the contact material according to particle size, is best illustrated by considering Figures 2, 3, and 4 together. Feed conduit 23 extends centrally and vertically into the upper end of vessel 10 and terminates in the upper section thereof. A plurality of downwardly and outwardly sloping, horizontally spaced-apart passageways or contact material distributor arms 44 extend radially outwardly from the lower section of conduit 23 to points adjacent the walls of conversion chamber 10. Distributor arms 44 terminate on a common level in the upper section of the chamber 10 and are adapted to receive contact material from conduit 23. The sides and top of distributor arms 44 make angles with the horizontal greater than the angle of repose of the contact material being used. The angle of repose varies with the particular contact material, but is generally within the range about 25 to 45 degrees. For most contact materials in commercial use, it is about 30 degrees and the sides and top of 44 preferably make an angle greater than about 40 degrees to effectively minimize segregation within arms 44.

The bottoms of arms 44 are open along their entire length from the point of connection to conduit 23. The lower edges of the bottoms should make angles with the horizontal less than the angle of repose of the contact material, that is, less than about 30 degrees, to prevent radial flow of contact material particles in the parts of the upper surface of the contact material bed between arms 44. The outer ends of arms 44 may be above or below the points where the bottoms connect to conduit 23, provided the above 30 degree limitation for the bottom is not exceeded. Conduit 26 for vaporized hydrocarbon charge enters chamber 10 at a level above the lower ends of arms 44.

In operation, a downwardly gravitating, substantially compact column or bed of granular contact material 45 is maintained within the lower section of conversion zone 10 with a gas plenum space 46 in the upper section of the zone above bed 45. A confined substantially compact feed stream of fresh contact material, at a temperature suitable to supply at least a major portion of the heat required by the conversion reaction without falling below the desired conversion temperature, is gravitated centrally and vertically into the upper section of zone 10 through passage 23. This stream is of horizontal cross-sectional area only a minor fraction of the horizontal cross-sectional area of column 45. Contact material is passed from the lower section of passage 23 and the stream therein downwardly and outwardly onto the upper surface of column 45 as a plurality of horizontally spaced-apart, substantially compact streams which extend radially outwardly from the central stream to points adjacent the outer edge of the upper surface of column 45 through downwardly and outwardly sloping passages 44. As previously stated, the sides and top of passages 44 are formed by solid surfaces at angles with the horizontal greater than the angle of repose of the contact material while the bottoms of 44 are in open communication with the upper surface of column 45 from the point of entry of contact material from the stream in 23 and are at angles with the horizontal less than the angle of repose of the contact material. Since the top and sides of streams in 44 are closed by the solid surfaces of 44, there is no communication between the transversely flowing contact material therein and the vaporized charge in plenum space 44. In addition, by maintaining the sides and top of 44 at angles greater than the angle of repose, segregation of the contact material therein according to particle size is minimized, since there is no free flow of contact material across a contact material surface in passages 44. The width of passages 44 increases as they extend outwardly from passage 23 to increase the portion of the upper surface of column 45 covered by 44. Contact material is also supplied to the upper surface of 45 from the lower end of passage 23. A vaporized hydrocarbon charge is supplied to plenum space 46 through conduit 26 at a temperature substantially below the temperature at which contact material is supplied through passage 23. This charge passes from the plenum space into the upper surface of column 45 between passages 44 and then passes downwardly through column 45 to effect the desired conversion as described in connection with Figure 1.

A modified form of this invention invention is illustrated in Figure 5, which is a sectional view similar to Figure 4. In Figure 5 a plurality of downwardly and outwardly sloping distributor arms 47 extend from central feed conduit 23 to points adjacent the walls of vessel 10. Arms 47 have top and sides at angles with the horizontal greater than about 40 degrees and bottoms open from the point of connection to or division from passageway 23 and lower edges at angles with the horizontal less than about 30 degrees. Extending from each of arms 47 is a second plurality of downwardly and outwardly sloping distributor arms 48. Arms 48 also have top and sides at angles with the horizontal greater than about 40 degrees and open bottoms from the points at which they extend from or connect to arms 47. The contact material feed stream gravitates into the conversion zone 10 through passage 23 and is divided into a plurality of streams which flow downwardly and outwardly through passages 47 onto the upper surface of the contact material column 45. Contact material also gravitates from the streams in 47 onto the upper surface of column 45 through passages 48. Vaporized charge is supplied to the plenum space above column 45 at a temperature below the temperature of the contact material in feed stream 23 and passes therefrom into the upper surface of column 45 between passages 47 and between passages 48. The conversion reaction then proceeds as described above.

Figure 6 illustrates another modification of this invention. A partition 49 extends transversely across the upper section of vessel 10 to define a seal chamber 50 thereabove and a conversion chamber 51 therebelow. A plurality of spaced-apart contact material feed passages 52 extend vertically through partition 49 into the upper section of conversion chamber 51. Extending outwardly from the lower sections of conduits 52 are distributor arms 44 of the same design as arms 44 shown in Figures 2, 3 and 4.

In operation, contact material, at a temperature suitable to supply at least a major portion of the heat required by the conversion reaction, is passed into the upper section of seal zone 50 through passage 53. Seal gas is supplied to zone 50 through passage 54 at a pressure above that in conversion zone 51. A plurality of streams of contact material gravitate from zone 50 into the upper section of conversion zone 51 through passages 52. Contact material passes outwardly through passages 44 from the lower section of 52 in the same manner as in Figure 2. Vaporized charge is supplied to plenum space 46 through passages 26 and passed therefrom into the upper surface of column 45 between passages 44.

In this invention, then, segregation of contact material according to particle size and heat exchange between contact material particles and reactant in plenum chamber 46 is prevented while the contact material is within passages 44, or 47 and 48, by the confining surfaces of the top and sides of 44, 47 and 48 which confine the contact material therein out of communication with plenum space 46. In the portion of the upper surface covered by these passages, contact material passes substantially unidirectionally downwardly as supplied from above, while directly beneath these passages the vapor charge flows across the contact material and then downwardly so as to come to equilibrium with the contact material. In the areas between these passages the situation is reversed, the vapor charge flows unidirectionally downwardly while the contact material flows transversely across the vapor streams. Thus, there is cross-flow of vapor and contact material in both areas. However, it has been found that if the distributing passages are properly spaced the temperature gradient, due to this cross-flow, can be minimized so as to have little adverse effect on the system. It has been found that if the maximum lateral distance center-to-center between any one distributing passage or arm and the next adjacent distributing passage or arm is maintained not greater than 16 inches and preferably not greater than 8 inches, the temperature gradients across the bed will be minor. Stated in another fashion if the radial center line of the lower end of any given passage or arm is considered, the distance laterally from any point on this center line to the nearest point on the center line of the next adjacent arm or passage should be not greater than about 16 inches and preferably not greater than about 8 inches. If these distance limitations are followed there will not be a temperature gradient across the reaction bed sufficient to affect the conversion reaction to any substantial degree. The next adjacent arm need not be the same arm, as different points on the center line of the first arm are considered as is illustrated in Figure 5.

The advantages of this critical spacing are illustrated in Figures 7 through 9. Figure 7 shows the reaction bed temperature plotted at the 2½ foot level plotted against the value of product produced for three different charge stocks. The properties of these charges and the conditions of conversion are given in the following table.

| Curve | A | B | C |
| --- | --- | --- | --- |
| Charge Stock Source | Mid-Continent Crude 44.5–89.5% Vol. Cut. | Mixed Gas Oil | Mirando Crude 4.5–94.8% Vol. Cut. |
| Charge Gravity, ° API | 29.6 | 31.4 | 22.2. |
| Charge Boiling Range, ° F | 200–954 | 212–760 | 360–861. |
| Catalyst Type | Silica-Alumina Beads with 0.15% $Cr_2O_3$. | Silica-Alumina Beads with 0.15% $Cr_2O_3$. | Silica-Alumina Beads with 0.15% $Cr_2O_3$. |
| Average Particle Diameter of Catalyst, Inches | 0.13 | 0.13 | 0.13. |
| Catalyst Inlet Temp., ° F | 1,030 | 1,030 | 1,030. |
| Catalyst Inlet Rate, Tons/Hr | 315 | 315 | 315. |
| Charge Vapor Inlet Temp., ° F | 790 | 790 | 790. |
| Charge Vapor Inlet Rate, Bbl./Day | 17,900 | 17,900 | 17,900. |
| Pressure of Conversion, p. s. i. g | 10 | 10 | 10. |

It is apparent that for each of these crudes, as for all crudes, there is a single temperature of conversion at which the most desirable and most valuable product is obtained. In the three cases shown this is about 863° F. Obviously, in actual operation, it is desirable to convert all of the reactant at the optimum and normally the heat supplied to the reaction zone is controlled so that if there were complete uniformity of temperature across the reaction bed this would occur. Of course, the character of the optimum product will vary with varying demands and economic conditions, so that today's optimum may not be tomorrow's but there will always be some one optimum.

When there are temperature gradients across the reaction bed, some portions of the bed will be below the optimum and some portions above and, of course, various portions of the reactant charge will be converted at temperatures other than the optimum, some overreacted and some underreacted. The wider the temperature differentials, the greater the magnitude of these deviations. In the prior art contact material feed passages were spaced no closer than about 39–40 inches. Referring to Figure 7, with this prior art spacing the temperature differential would be that designated by points G—G. Conversion of various parts of the charge would occur all around the curves of Figure 7, between points G—G, to give a total product substantially less in value than the optimum.

When this invention is used, however, with the preferred spacing, the conversion will occur only between points L—L, and there will result a product of value and composition very close to the optimum.

Figure 8 illustrates the criticality of the spacing herein specified and is of general applicability. It plots spacing against percent increase in product revenue over the product revenue obtained at the best prior art spacing of 39 inches. It is seen that there is little or no improvement until the supply areas are within about 20 inches center-to-center. At this point the curve breaks sharply upwardly. This means fundamentally that the total lateral flow of contact material should never exceed 10 inches, contact material normally flowing laterally one-half the distance to the next feed stream. Similarly, the lateral flow of vapor is limited to 10 inches. A spacing of 16 inches rather than 20 was chosen for the particular design here to insure that these fundamental limits are not violated. Because of the peculiar shape of the supply passages, there is the possibility that contact material might not flow laterally directly toward the next adjacent passage. However, by limiting the center-tocenter spacing to 16 inches, it is insured that the contact material will never travel more than 10 inches.

Figure 9 shows a curve similar to Figure 8 but for two specific charges with actual dollar savings plotted. The possibility for substantial improvement through use of this invention is apparent.

The broader claims of U. S. patent application Serial Number 529,063, filed August 17, 1955, also dominate this invention.

While the conversion chamber of this invention has been shown as being circular in cross-sectional shape, it may take other shapes, such as rectangular, hexagonal, etc. Also, while this invention has been illustrated in connection with hydrocarbon conversion reactions wherein the contact material supplies a major portion of the heat required by the reaction and therefore enters at a higher temperature than the vapor charge, it applies equally well where the gaseous reactant enters at a higher temperature than the contact material.

When used for hydrocarbon conversions wherein the contact material supplies at least a major portion of the heat required, the contact material should be heated, before entering the conversion zone, to a temperature sufficient to supply the required amount of heat without falling below the desired conversion temperature. Where the contact material has a catalytic effect on the reaction, the temperature thereof on introduction should generally be within the range about 900° F. to 1250° F. Where the contact material serves merely as a heat carrier for a thermal cracking or coking reaction, its charging temperature may range as high as 1700° F. The hydrocarbon charge should be substantially entirely vaporized and should be introduced at a temperature within the range about 650° F. to 900° F. The ratio of contact material to vaporized charge introduced into the conversion zone should generally be within the range about 1.5 to 20 parts of contact material per part of hydrocarbon charge by weight. If desired, a liquid hydrocarbon charge may also be supplied to the system, either at a level below the bottoms of arms 44 or into feed stream 23.

This invention should be understood to include all changes and modifications of the examples of the invention herein chosen for purposes of disclosure which do not constitute departures from the spirit and scope of the invention.

I claim:

1. A continuous process for the conversion of fluid reactants in the presence of a downwardly gravitating, substantially compact column of granular contact material, which comprises: maintaining said column within the lower section of a confined conversion zone, maintaining a gas plenum space above said column within the upper section of said zone, passing at least one confined substantially compact free stream of contact material of substantially less horizontal cross-sectional area than the horizontal cross-sectional area of said column into the upper section of said zone, passing contact material from said stream onto the upper surface of said column through a plurality of horizontally spaced-apart confined passages extending downwardly and outwardly from said feed stream, the sides and top of said passages making angles with the horizontal greater than the angle of repose of the contact material and the bottoms of said passages being open from the point of division from said feed stream so as to communicate with the upper surface of said column and said passages being of such a size and so spaced that the maximum distance center-to-center from any one stream to the next adjacent stream will be not greater than 16 inches, supplying a fluid reactant to said plenum space above said column, passing fluid reactant from said plenum space between said passages into the upper surface of said column and downwardly through said column to effect the desired conversion, removing products of conversion from the lower section of said zone separately of contact material and removing contact material from the lower section of said column.

2. A continuous process for the conversion of a vaporized hydrocarbon charge in the presence of a downwardly gravitating, substantially compact bed of granular contact material, which comprises: maintaining said bed within the lower section of a confined conversion zone, maintaining a vapor plenum space above said bed in the upper section of said conversion zone, passing at least one confined feed stream of contact material of substantially less horizontal cross-sectional area than said bed and at a temperature suitable to supply a substantial portion of the heat required by the conversion reaction into the upper section of said conversion zone, dividing said stream into a plurality of downwardly and outwardly sloping substantially compact horizontally spaced-apart streams and passing said streams through a plurality of passages open on their bottoms from the point of entry of said plurality of streams from said feed stream onto the upper surface of said column, the sides and top of said plurality of streams being maintained out of communication with said plenum space by means of downwardly and outwardly sloping solid surfaces which confine the top and sides of said streams at angles with the horizontal greater than the angle of repose of the contact material, and the width of said streams increasing as they pass outwardly from said feed stream and said streams being of such a size and so spaced that the maximum distance center-to-center laterally between any one stream and the next adjacent stream is less than about 16 inches, supplying a vaporized hydrocarbon charge to said plenum space at a temperature substantially below the temperature of said contact material feed stream, passing vaporized charge from said plenum space between said plurality of streams into the upper surface of said column, passing the vaporized charge downwardly through said bed to effect the desired conversion, removing products of conversion from the lower section of said zone and removing contact material from the lower section of said bed.

3. A continuous process for the conversion of a vaporized hydrocarbon charge in the presence of a downwardly gravitating, substantially compact bed of granular contact material, which comprises: maintaining said column within the lower section of a confined conversion zone, maintaining a gas plenum space above said column within the upper section of said zone, passing at least one confined substantially compact feed stream of contact material at a temperature suitable to supply a substantial portion of the heat required by the conversion reaction and of substantially less horizontal cross-sectional area than said column into the upper section of said zone above said column, passing contact material from said stream onto the upper surface of said column as a plurality of substantially compact streams through a plurality of downwardly and outwardly sloping passages open on their bottoms from the point of entry of contact material from said feed stream, said passages being of such a size and so spaced that the maximum distance between any one passage and the next adjacent passage will be not greater than 16 inches center-to-center laterally and the sides and top of said passages being formed by solid surfaces at angles with the horizontal greater than the angle of repose of the contact material and the lower edges of each of said passages making an angle with the horizontal less than the angle of repose of the contact material whereby the contact material in said passages is maintained out of communication with said plenum space, supplying a substantially entirely vaporized hydrocarbon charge to said plenum space at a temperature below the temperature of the contact material feed stream, passing said charge from said plenum space between said passages into the upper surface of said column and downwardly through said column to effect the desired conversion, removing products of conversion from the lower section of said zone and removing spent contact material from the lower section of said column.

4. A continuous process for the conversion of a vaporized hydrocarbon reactant to gaseous products in the presence of a downwardly gravitating, substantially compact column of granular contact material, which comprises: maintaining said column within the lower section of a confined conversion zone, maintaining a gas plenum space above said column in the upper section of said zone, passing a confined substantially compact stream of contact material centrally and substantially vertically into the upper end of said conversion zone, said stream being of horizontal cross-sectional area only a minor fraction of the horizontal cross-sectional area of said bed and at a temperature suitable to supply a major portion of the heat required by the conversion reaction, passing contact material downwardly and outwardly from said stream onto the upper surface of said column as a plurality of horizontally spaced-apart substantially compact streams extending radially outwardly from said central stream through a plurality of downwardly and outwardly sloping passages which extend to points adjacent the outer edges of said upper surface of said column and which cover a major portion of the area of the upper surface of said column and are so spaced that the maximum distance between any one passage and the next adjacent passage will be not greater than 8 inches center-to-center laterally, the sides and top of said passages being formed by solid surfaces at angles with the horizontal greater than the angle of repose of the contact material, which solid surfaces confine the contact material streams therein out of communication with said plenum space and the bottom of said passage being in open communication with said column from the point of entry of contact material from said central stream to said passages and being at an angle with the horizontal less than the angle of repose of the contact material, supplying a substantially entirely vaporized hydrocarbon reactant to said plenum space at a temperature substantially below the temperature of the contact material supplied to the upper surface of said column, passing vaporized reactant from said plenum space into the upper surface of said column between said plurality of passages and passing said reactant downwardly through said column to effect the desired conversion to gaseous products, removing said products from the lower section of said zone separately of contact material and removing spent contact material from the lower section of said column.

5. A continuous process for the conversion of a vaporized hydrocarbon charge to gaseous products in the presence of a downwardly gravitating, substantially compact column of granular contact material, which comprises: maintaining said column within the lower section of a confined conversion zone, maintaining a gas plenum space above said column in the upper section of said zone, passing a confined substantially compact stream of contact material centrally and vertically into the upper end of said zone, said stream being of horizontal cross-sectional area only a minor fraction of the horizontal cross-sectional area of said column and at a temperature suitable to supply at least the major portion of the heat required by the conversion reaction, passing contact material from said stream onto the upper surface of said column as a plurality of horizontally spaced-apart substantially compact streams extending radially outwardly from said central stream through a plurality of downwardly and outwardly sloping passages having closed top and sides at angles with the horizontal greater than the angle of repose of the contact material and extending outwardly to points adjacent the outer edges of the upper surface of said column, said passages being open on their bottoms from the point of entry of contact material from said central stream so as to communicate with the upper surface of said column and having bottoms which make angles with the horizontal less than the angle of repose of the contact material, also passing contact material onto the upper surface of said column through a plurality of downwardly and outwardly sloping passages extending from the sides of each of said first-named plurality of passages, the sides and top of said last-named plurality of passages being at angles with the horizontal greater than the angle of repose of the contact material while the bottoms of said last-named plurality of passages are in open communication from the point of entry of contact material from said first-named passages with the upper surface of said column and make angles with the horizontal less than the angle of repose of the contact material, the passages making up both of said pluralities of passages being so spaced that the maximum distance laterally from any one passage to the next adjacent passage center-to-center is not greater than 16 inches, supplying substantially entirely vaporized hydrocarbon charge to said plenum space at a temperature substantially below the temperature at which contact material is supplied to the upper surface of the column, passing vaporized charge from said plenum space into the upper surface of the column between said passages, passing the charge downwardly through said column to effect the desired conversion to gaseous products, removing said products from the lower section of said zone separately of contact material and removing spent contact material from the lower section of said column.

6. A continuous process for the conversion of vaporized hydrocarbon charge in the presence of a downwardly moving, substantially compact column of granular contact material, which comprises: maintaining said column within the lower section of a confined conversion zone, maintaining a gas plenum space above said column in the upper section of said zone, passing a plurality of substantially vertical compact feed streams of contact material into the upper section of said zone, said streams each being of substantially less horizontal cross-sectional area than the horizontal cross-sectional area of said column and the contact material in said streams being at a temperature suitable to supply at least a major portion of the heat required by the conversion reaction, passing contact material from each of said streams onto the upper surface of said column as a plurality of horizontally spaced-apart substantially compact streams extending radially outwardly from each of said feed streams through a plurality of downwardly and outwardly sloping passages having closed top and sides at angles with the horizontal greater than the angle of repose of the contact material, said passages being open on their bottoms from the point of entry of contact material from said feed streams so as to communicate with the upper surface of said column and having bottoms which make angles with the horizontal less than the angle of repose of the contact material, said passages further being so spaced that the maximum distance center-to-center laterally between any one passage and the next adjacent passage is less than 8 inches, supplying a substantially entirely vaporized hydrocarbon charge to said plenum space at a temperature substantially below the temperature at which contact material is supplied to the upper surface of said column, passing the vaporized charge from said plenum space into the upper surface of said column between said plurality of passages, passing the charge downwardly through said column to effect the desired conversion to gaseous products, removing the products from the lower section of the conversion zone separately of contact material and removing spent contact material from the lower section of said column.

7. An apparatus for the conversion of gaseous reactants in the presence of a moving mass of granular contact material, which comprises in combination: an enclosed conversion chamber adapted to confine a downwardly gravitating, substantially compact bed of granular contact material in its lower section, members defining at least one contact material feed passageway extending vertically into said vessel and terminating in the upper section thereof, members defining a plurality of horizontally spaced-apart downwardly and outwardly sloping passageways extending from the lower section of said feed passageway and adapted to receive contact material therefrom, each of said plurality of passageways having top and sides which make angles with the horizontal greater than about 30 degrees and being open on the bottom from the point of connection to said feed passageway, said plurality of passageways being spaced apart such that the distance between any point along the center line of any one passageway and the nearest point on center line of the next adjacent passageway is not greater than about 16 inches, means for supplying gaseous reactant to said chamber at a level above the lower ends of said plurality of passageways, means for removing the products of conversion from said chamber separately of contact material and means for removing contact material from the lower section of said chamber.

8. An apparatus for the continuous conversion of gaseous reactants in the presence of a moving mass of granular contact material, which comprises in combination: an enclosed conversion chamber adapted to confine a downwardly gravitating, substantially compact bed of granular contact material in its lower section, at least one feed conduit for contact, material extending into and terminating in the upper section of said chamber, a plurality of horizontally spaced-apart distributor arms extending outwardly from said conduit and adapted to receive contact material therefrom, the top and sides of said arms being closed and forming angles with the horizontal greater than about 40 degrees and the bottom of said arms being open from the point of connection to said conduit and forming an angle with the horizontal less than about 30 degrees and the width of said arms increasing as they extend outwardly from said conduit and said arms being so spaced that the maximum lateral distance center-to-center between said arms is not greater than about 16 inches between any one arm and the next adjacent arm, means for supplying gaseous reactants to said chamber at a level above the lower ends of said arms, means for removing products of the conversion from said chamber separately of contact material and means for removing contact material from the lower section of said chamber.

9. An apparatus for the conversion of a vaporized hydrocarbon charge in the presence of a moving mass of granular contact material, which comprises in combination: an enclosed substantially vertical conversion chamber adapted to confine a downwardly gravitating, substantially compact column of granular contact material within its lower section, a contact material feed conduit extending centrally and vertically into the upper end of said chamber and terminating in the upper section thereof, a plurality of horizontally spaced-apart downwardly and outwardly sloping contact material distributor arms extending radially outwardly from the lower section of said conduit to points adjacent the walls of said chamber and adapted to receive contact material from said conduit, said arms having closed top and sides at angles with the horizontal greater than about 40 degrees and bottoms open from the point of connection to said conduit with lower edges at an angle with the horizontal less than about 30 degrees, said arms being so spaced that there is a distance less than about 16 inches between any point on the center line of any one arm and the nearest point on the center line of the next adjacent arm, means for supplying a vaporized hydrocarbon charge to the upper section of said chamber at a level above the bottom of said arms, means for removing products of conversion from the lower section of said chamber separately of the contact material and means for removing granular contact material from the lower section of said chamber.

10. An apparatus for the continuous conversion of a vaporized hydrocarbon charge to gaseous products in the presence of a downwardly gravitating, substantially compact column of granular contact material, which comprises in combination: an enclosed substantially vertical conversion chamber adapted to confine said column of contact material in its lower section, a contact material feed conduit extending centrally and vertically into the upper end of said chamber and terminating in the upper section thereof, a plurality of horizontally spaced-apart contact material distributor arms extending radially outwardly of said conduit to points adjacent the walls of said chamber and adapted to receive contact material from said conduit, said arms having closed top and sides which make angles with the horizontal greater than about 40 degrees and bottoms open from the point of connection of said arms to said conduit with lower edges at an angle with the horizontal less than about 30 degrees, a second plurality of contact material distributor arms extending outwardly from each of said first plurality and adapted to receive contact material therefrom, said second plurality of distributor arms having closed top and sides which make angles with the horizontal greater than about 40 degrees and open bottoms from the points of connection to said first plurality of arms with lower edges at angles less than about 30 degrees, said pluralities of arms being so spaced that the center-to-center distance from any one arm to the next adjacent arm is less than about 8 inches, means for supplying vaporized hydrocarbon charge to said chamber at a level above the lower ends of said distributor arms, means for removing gaseous products from the lower section of said chamber and means for removing contact material from the lower section of said chamber.

11. An apparatus for the continuous conversion of a vaporized hydrocarbon charge to gaseous products in the presence of a downwardly gravitating, substantially compact column of granular contact material, which comprises in combination: an enclosed substantially vertical conversion chamber adapted to confine said column in its lower section, a plurality of spaced-apart substantially vertical contact material feed conduits extending into the upper end of said chamber and terminating in the upper section thereof, a plurality of contact material distributor arms extending outwardly and downwardly from each of said conduits and adapted to receive contact material therefrom, said arms having closed top and sides at angles with the horizontal greater than about 40 degrees and bottoms open from the point of connection to said conduits with lower edges at angles with the horizontal less than about 30 degrees, said arms being so spaced that the center-to-center distance between any given arm and the next adjacent arm is less than about 8 inches, means for supplying a vaporized hydrocarbon charge to said chamber at a level above the bottoms of said arms, means for removing gaseous products from the lower section of said chamber separately of contact material and means for removing contact material from the lower section of said chamber.

No references cited.

UNITED STATES PATENT OFFICE
CERTIFICATE OF CORRECTION

Patent No. 2,846,371                                                       August 5, 1958

Raymond R. Halik

It is hereby certified that error appears in the printed specification of the above numbered patent requiring correction and that the said Letters Patent should read as corrected below.

Column 3, line 56, for "volumn" read -- column --; column 9, line 55, for "free" read -- feed --; column 14, line 20, for "of said" read -- from said --.

Signed and sealed this 2nd day of December 1958.

(SEAL)
Attest:

KARL H. AXLINE
Attesting Officer

ROBERT C. WATSON
Commissioner of Patents